United States Patent
Brennan et al.

(10) Patent No.: US 10,604,590 B2
(45) Date of Patent: Mar. 31, 2020

(54) DI- OR TRISTYRYLPHENOL MONOGYCIDYL ETHER ADDUCT OF MALTODEXTRIN

(71) Applicants: Dow Global Technologies LLC, Midland, MI (US); Rohm and Haas Company, Philadelphia, PA (US)

(72) Inventors: David J. Brennan, Midland, MI (US); Gregoire Cardoen, Blue Bell, PA (US); Jonathan DeRocher, Coopersburg, PA (US); Robert E. Hefner, Jr., Rosharon, TX (US); Antony K. Van Dyk, Blue Bell, PA (US); Tianlan Zhang, Garnet Valley, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 276 days.

(21) Appl. No.: 15/375,530

(22) Filed: Dec. 12, 2016

(65) Prior Publication Data
US 2017/0174793 A1 Jun. 22, 2017

Related U.S. Application Data

(60) Provisional application No. 62/268,705, filed on Dec. 17, 2015.

(51) Int. Cl.
  C08B 31/14 (2006.01)
  C08G 65/26 (2006.01)
  C08L 3/08 (2006.01)
  C09D 7/65 (2018.01)

(52) U.S. Cl.
  CPC .......... *C08B 31/14* (2013.01); *C08G 65/2603* (2013.01); *C08L 3/08* (2013.01); *C09D 7/65* (2018.01)

(58) Field of Classification Search
  CPC ..................................................... C08B 31/14
  USPC ........................................................ 536/46
  See application file for complete search history.

(56) References Cited

U.S. PATENT DOCUMENTS

| 4,762,857 A | 8/1988 | Bollin, Jr. et al. |
| 4,831,128 A | 5/1989 | Tsai et al. |
| 4,839,164 A | 6/1989 | Smith |
| 5,026,566 A | 6/1991 | Roser |
| 5,340,394 A | 8/1994 | Elsamanoudi |
| 5,463,101 A | 10/1995 | Reierson |
| 5,543,513 A | 8/1996 | Mandai et al. |
| 6,062,230 A | 5/2000 | Kajgana |
| 7,238,645 B1 | 7/2007 | Chow et al. |
| 7,381,796 B2 | 6/2008 | Roser |
| 7,705,082 B2 | 4/2010 | Porzio et al. |
| 8,231,925 B2 | 7/2012 | Ganesan et al. |
| 8,444,758 B2 | 5/2013 | Stockl et al. |
| 8,822,580 B2 | 9/2014 | Korenkiewicz et al. |
| 2007/0155880 A1 | 7/2007 | Bobsein et al. |
| 2008/0103237 A1 | 5/2008 | Strepka et al. |
| 2009/0076202 A1 | 3/2009 | Seibold et al. |
| 2009/0186972 A1 | 7/2009 | Zong et al. |
| 2010/0280162 A1 | 11/2010 | Stesikova et al. |
| 2014/0205530 A1 | 7/2014 | Guillot et al. |
| 2014/0256852 A1 | 9/2014 | Vandezande et al. |
| 2015/0073080 A1 | 3/2015 | Wu et al. |
| 2015/0133604 A1 | 5/2015 | Zong et al. |

FOREIGN PATENT DOCUMENTS

| DE | 4417947 A1 | 11/1995 |
| EP | 0282623 A1 | 9/1988 |
| EP | 0384167 A1 | 8/1990 |
| JP | 1056602 A | 3/1989 |
| WO | 1999010413 A2 | 3/1999 |
| WO | 2001070024 A2 | 9/2001 |
| WO | 2007128388 A2 | 11/2007 |
| WO | 2014044616 A1 | 3/2014 |
| WO | 2014146958 A1 | 9/2014 |

*Primary Examiner* — Shaojia A Jiang
*Assistant Examiner* — Everett White
(74) *Attorney, Agent, or Firm* — Reid S. Willis

(57) ABSTRACT

The present invention relates to a compound which is a di- and/or a tristyrylphenol monoglycidyl ether adduct of the compound of Formula I:

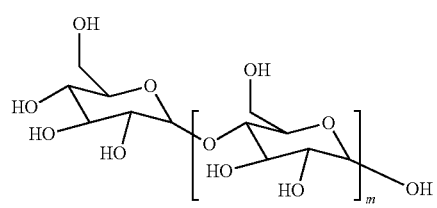

where m is from 1 to 60. The compound of the present invention is useful as an open time additive in coatings formulations.

10 Claims, No Drawings

DI- OR TRISTYRYLPHENOL MONOGYCIDYL ETHER ADDUCT OF MALTODEXTRIN

BACKGROUND OF THE INVENTION

The present invention relates to a di- and/or a tristyrylphenol monoglycidyl ether adduct of maltodextrin and its preparation. This compound is useful as an addictive to improve open time in a coatings formulation.

Government regulations and market movement continually drive toward zero volatile organic compounds (VOC) for coating formulations. Consequently, waterborne formulations that are free of volatile solvents and coalescents have become increasingly popular in the industry. Nevertheless, paint properties have been compromised due to this sea change; among them is open time, which is the period of time during which a freshly applied paint film can be reworked without leaving brush marks. In a solvent-borne system, open time is about 30 to 45 min; in a typical waterborne formulation, open time is on the order of 3 to 5 min. Accordingly, there is a need in the art to find an additive for waterborne formulations that increases open time over currently available additives without degrading other properties of the final coating, such as film adhesive and cohesive strength, hardness, block resistance, early blister resistance, scrub and wash resistance, stain resistance, and mar resistance.

SUMMARY OF THE INVENTION

The present invention addresses a need in the art by providing, in a first aspect, a compound which is a di- and/or a tristyrylphenol monoglycidyl ether adduct of the compound of Formula I:

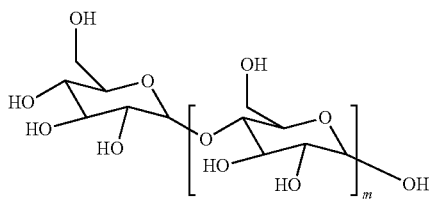

I where m is from 1 to 60; wherein the di- and/or a tristyrylphenol monoglycidyl ether adduct of the compound of Formula I is formed by the reaction of the compound of Formula I and the compound of Formula II:

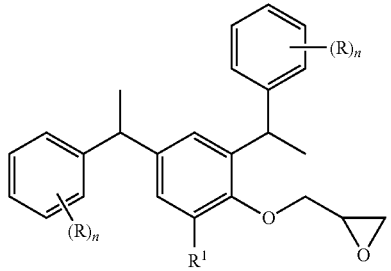

II where each R is independently F, Cl, Br, CN, $C_1$-$C_6$-alkyl, or $C_1$-$C_6$-alkoxy; $R^1$ is H or 1-phenylethyl; and each n is independently 0, 1, 2, or 3.

In a second aspect, the present invention is a method comprising the step of contacting a maltodextrin with a di- and/or a tristyrylphenol monoglycidyl ether in the presence of a Lewis acid catalyst under conditions sufficient to produce a di- and/or a tristyrylphenol monoglycidyl ether adduct of the maltodextrin, wherein the maltodextrin is represented by Formula I:

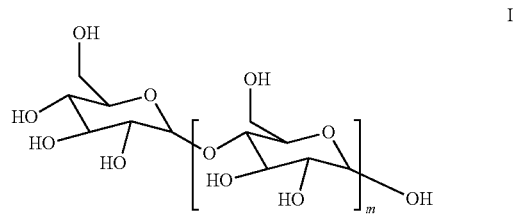

I where m is from 1 to 60; and the di- and/or the tristyrylphenol monoglycidyl ether is represented by Formula II:

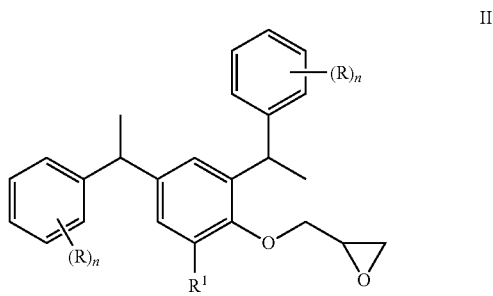

II where each R is independently F, Cl, Br, CN, $C_1$-$C_6$-alkyl, or $C_1$-$C_6$-alkoxy; $R^1$ is H or 1-phenylethyl; and each n is independently 0, 1, 2, or 3.

The compound of the present invention is useful as an open time additive in coatings formulations.

DETAILED DESCRIPTION OF THE INVENTION

The present invention is a compound which is a di- and/or a tristyrylphenol monoglycidyl ether adduct of the compound of Formula I:

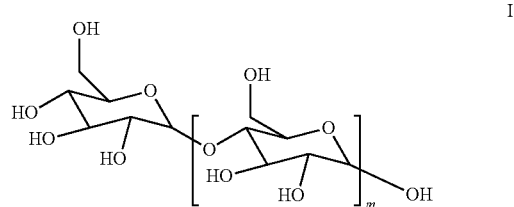

I where m is from 1 to 60.

The di- and/or the tristyrylphenol monoglycidyl ether can be prepared by contacting under reactive conditions an epihalohydrin with a di- and/or the tristyryl monophenol of Formula IIa:

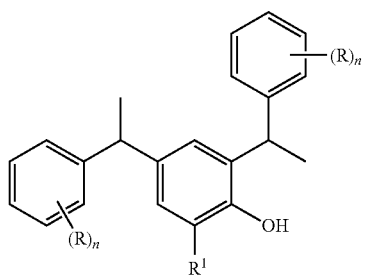

IIa where R, $R^1$, and n are as previously defined, to form the di- and/or the tristyrylphenol monoglycidyl ether of Formula II.

The compound of Formula II is preferably prepared by contacting an epihalohydrin with the compound of Formula IIa in the presence of a base such as an alkali metal or alkaline earth metal hydroxide, carbonate, or bicarbonate, or a mixture thereof. Examples of suitable bases include NaOH, KOH, $Na_2CO_3$, $K_2CO_3$, $NaHCO_3$, $KHCO_3$, NaH, and KH, with aqueous NaOH being preferred. A preferred epihalohydrin is epichlorohydrin. In another epoxidation method, the compound of Formula II may be reacted with an alkali metal hydride such as NaH or KH followed by reaction with an epihalohydrin.

The process may be carried out in the presence of a suitable solvent such as toluene, methylisobutyl ketone, methylene chloride, or isopropanol. Alternatively, the reaction may be conducted without any ancillary solvent, wherein epihalohydrin plays the role of both reagent and solvent. In any case, the epihalohydrin is advantageously used in stoichiometric excess with respect to the compound of Formula IIa.

The process is typically performed at or around atmospheric pressure, at a temperature preferably in the range of from 25° C. to 70° C., and for a time to achieve conversion to the desired product.

Recovery and purification of the desired product can be carried out by a variety of methods well known in the art; where epichlorohydrin is used as a solvent, vacuum distillation is advantageously used for removal and recycling.

The compound of Formula II, preferably where each n is 0, is contacted with the compound of Formula I in the presence of a Lewis acid to form the di- and/or the tristyrylphenol monoglycidyl ether adduct of the compound of Formula I. Examples of Lewis acids include $BF_3$, $ZnCl_2$, $MgBr_2$, $SnCl_4$, $TiCl_4$, $FeCl_3$, $AlCl_3$, $MeAlCl_2$, $Me_2AlCl$, and $LiClO_4$, with $BF_3$ being preferred. The reaction is preferably carried out in the presence of a polar aprotic solvent such as dimethylacetamide, preferably at a temperature in the range of from 25° C., more preferably from 40° C., and most preferably to 60° C., to 165° C., more preferably to 125° C., and most preferably to 100° C. Preferably, the reaction is carried out in the substantial absence of water, more preferably under anhydrous conditions.

As used herein the term "di- and/or tristyrylphenol monoglycidyl ether adduct of the compound of Formula I" refers to a compound or a mixture of compounds that are formed from the reaction of the compound of Formula I (maltodextrin) and the compound of Formula II. The adduct may be monofunctional or multifunctional and is preferably monofunctional or difunctional, more preferably monofunctional. An example of a monofunctional adduct formed from the reaction of one mole of the compound of Formula I and one mole of the compound of Formula II (where n is 0 and $R^1$ is 1-phenylethyl) is represented by the following Formula III:

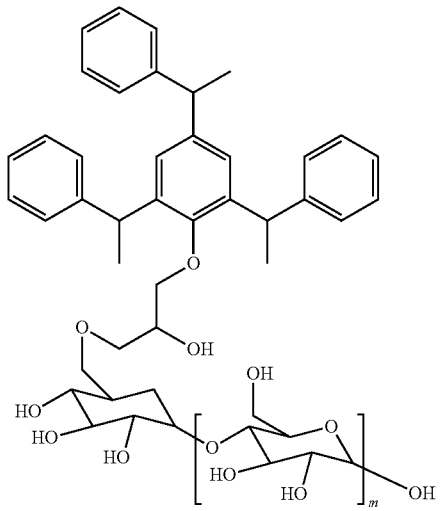

III

The actual point of attachment of the ring-opened glycidyl ether groups may be at any of the available OH sites of the maltodextrin. Furthermore, the ring-opened glycidyl ether groups are tristryryl phenoxypropanol groups represented by either or both of the following isomers:

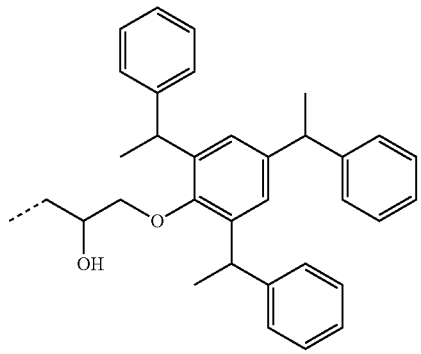

Isomer 1

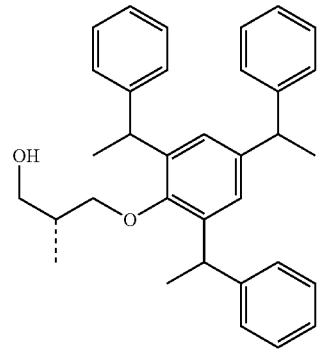

Isomer 2 where the dotted lines represent the point of attachment of the tristryryl phenoxypropanol group to an available oxygen atom of the maltodextrin molecule. The adduct can be characterized by number average molecule molecular weight ($M_n$) as measured by Matrix Assisted Laser Desorption Ionization Mass Spectrometry (MALDI-MS). By definition, it is assumed that the response factors for all the intensities observed in the mass spectrum are the same. The $M_n$ of the adduct is in the range of 800 to 10,000 Daltons.

While not being bound to theory, it is believed that the bulky hydrophobic di- and tristyryl groups have a strong affinity to the latex particle surface and forms a protective layer around the colloid while the hydrophilic portion creates steric repulsion between particles. These features result in a delay of latex particle coalescence thereby increasing open time.

EXAMPLES

Intermediate Example 1

Preparation of Tristyrylphenol Monoglycidyl Ether

A 2-L, 3-neck round bottom reactor was charged with tristyrylphenol (the compound of Formula II where m=0, 200.0 g, obtained from Saltigo GmbH, Leverkusen, DE, 66% 1,3,5-tristyrylphenol, 26% 2,6-distyryl phenol) and epichlorohydrin (455.4 g). Isopropanol (245.2 g) was then added with stirring, followed by the addition of deionized (DI) water (39.6 g). The contents of the reactor were heated to 51° C., whereupon aqueous NaOH (17.7 g in 70.9 g DI water) was added dropwise over 20 min. The mixture was heated and stirred for an additional 20 min, after which time the contents were allowed to settle for 4 min to form a biphasic mixture.

The aqueous layer was removed from the reactor leaving a clear organic material. The contents were heated to 50° C. with stirring for 4 min, at which time a second portion of aqueous NaOH (7.9 g in 31.5 g water) was added dropwise over 15 min. The reactants were stirred and heated for an additional 20 min, after which time the reactor contents were allowed to settle to form a biphasic mixture. The aqueous layer was removed leaving a clear light yellow colored organic layer.

The contents were once again heated to 50° C. with stirring for 1 min, after which time a third portion of aqueous NaOH (2.0 g in 7.9 g DI water) was added dropwise over 4 min. The reactants were stirred and heated for an additional 16 min, after which time the contents of the reactor were transferred to a separatory funnel and allowed to settle. The aqueous layer was removed and the organic portion washed three times with DI water. For the third washing the biphasic mixture was allowed to settle for 45 min. The resultant organic layer was dried over $Na_2SO_4$ supported in a fitted glass funnel on a side arm flask, then vacuum filtered. Solvent was removed in vacuo to give a transparent light yellow colored viscous liquid (215.19 g), which was found to be a mixture of the monoglycidyl ether of tristyrylphenol and the monoglycidyl ether of distyryl phenol, confirmed by epoxide titration and gas chromatographic analysis.

Example 1

Preparation of Tristyrylphenol Monoglycidyl Ether Adduct of Maltodextrin

Maltodextrin obtained from Sigma-Aldrich having a Dextrose Equivalent of 16.5 to 19.5 (10 g, ~0.01 mol) was dissolved in anhydrous dimethylacetamide (50 mL). The solution was cannulated into a pre-dried 250-mL reaction flask equipped with a magnetic stir bar. A portion of the di- and tristyrylphenol monoglycidyl ether of Example 1 (TSP-GE, 4.62 g, 0.01 mol) was introduced into a pre-dried 50-mL 1-neck round bottom flask purged with $N_2$; then, 15 mL of anhydrous dimethylacetamide was cannulated into the reaction flask. TSP-GE dissolved over the course of 30 min and was then cannulated to the reaction flask containing the maltodextrin. $BF_3$.etherate (1 mL) was then added to the flask, whereupon the contents of the reaction were heated to 80° C. for 21 h. About 15 h into the reaction time, additional $BF_3$.etherate (1 mL) was added to the reaction flask. After the 21 h heating cycle was complete, the contents of the reaction were allowed to stir at room temperature for an additional 24 h. NaOH (5 mL of 0.05 M NaOH followed by 1.5 mL of 50% NaOH) was added to the contents followed by acetic acid (1 mL). Dimethylacetamide was removed in vacuo followed by freeze drying of the sample. An off-white powder was obtained. Structure was confirmed by $^1H$ NMR (δ7.47-6.87, 17 H, δ5.25-3.01, 60 H, δ2.39-1.69, 15 H, δ1.66-1.31, 8H) and MALDI-TOF mass spectrometry (each set of peaks separated by 162 Da, and as an example for one set of peaks: m/z=1937.7, 1961.6, 1985.5 Da, where z is the charge per molecule). The peak at 1961.6 is consistent with the presence of a monosubstituted maltodextrin (m=8); the peak at 1985.5 is consistent with the presence of a non-substituted maltodextrin (m=11); and the peak at 1937.7 is consistent with the presence of a disubstituted maltodextrin (m=5).

MALDI-TOF Measurement

The MALDI mass spectrum was acquired on a Bruker Daltonics ultraflex MALDI-TOF mass spectrometer equipped with a nitrogen laser (λ=337 nm). In the MALDI experiment, 20 mg of 2,5-dihydroxybenzoic acid was dissolved in 1 mL of THF. Example 1 was dissolved in dimethylacetamide at a concentration of 5 mg/mL. The solution was premixed with the matrix solution at a ratio of 1:10 v/v. NaI was added into the sample/matrix mixture and 0.3 µL of the mixture was then placed on the sample plate and was air dried for MALDI-MS analysis.

Preparation of Paint Formulation with Glycidyl Ether Adduct of Maltodextrin

The glycidyl ether adduct of maltodextrin of Example 1 was evaluated for open time in the following screening formulation:

TABLE 1

Paint Formulation With Open Time Additive

| Material Name | Pounds | Gallons |
| --- | --- | --- |
| RHOPLEX ™ HG-706 Binder | 584.1 | 65.95 |
| BYK-024 Defoamer | 1.0 | 0.12 |
| Propylene Glycol | 4.3 | 0.50 |
| TRITON ™ X-100 Surfactant | 4.4 | 0.49 |
| Water | 16.7 | 2.00 |
| KATHON ™ LX 1.5% Biocide | 1.5 | 0.18 |
| TAMOL ™ 2002 Dispersant | 2.0 | 0.23 |
| Ammonia (28%) | 1.0 | 0.13 |
| Ti-Pure R-746 $TiO_2$ | 285.0 | 14.66 |
| Water | 20.0 | 2.40 |
| TEXANOL Coalescent | 7.9 | 1.00 |
| ACRYSOL ™ RM-2020E Rheology Modifier | 20.0 | 2.30 |
| ACRYSOL ™ RM-725 Rheology Modifier | 3.0 | 0.35 |
| BYK-024 Defoamer | 2.0 | 0.24 |
| Water | 58.4 | 6.95 |
| Open Time Additive (Active) | 20.6 | 2.5 |
| Totals | 1031.9 | 100.00 |

Open time was measured in accordance with ASTM-D7488. Open time for the formulation with the additive of Example 1 was found to be 7 min while open time for the formulation without any additive was 5-6 min.

The invention claimed is:

1. A compound which is a di- and/or a tristyrylphenol monoglycidyl ether adduct of the compound of Formula I: A compound which is a di- and/or a tristyrylphenol monoglycidyl ether adduct of the compound of Formula I:

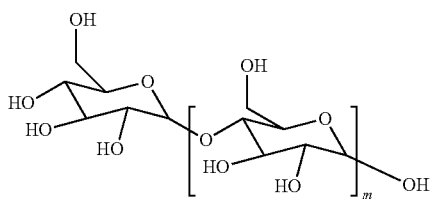

where m is from 1 to 60; wherein the di- and/or a tristyrylphenol monoglycidyl ether adduct of the compound of Formula I is formed by the reaction of the compound of Formula I and the compound of Formula II:

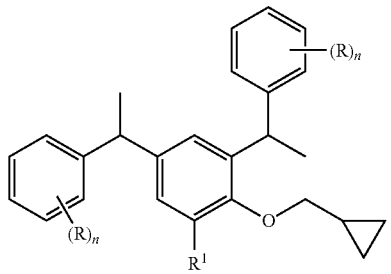

where each R is independently F, Cl, Br, CN, $C_1$-$C_6$-alkyl, or $C_1$-$C_6$-alkoxy; $R^1$ is H or 1-phenylethyl; and each n is independently 0, 1, 2, or 3.

2. The compound of claim 1 wherein the adduct of the compound of Formula I is a monofunctional or a difunctional adduct.

3. The compound of claim 1 wherein the adduct of the compound of Formula I is a monofunctional adduct of tristyrylphenol monoglycidyl ether.

4. The compound of claim 1 which has a number average molecular weight of from 800 to 10,000 Daltons.

5. The compound of claim 4 which is substituted with one or two distyryl phenoxypropanol groups or one or two tristyryl phenoxypropanol groups; or one distyryl phenoxypropanol group and one tristyryl phenoxypropanol group.

6. The compound of claim 4 which is substituted with one tristyryl phenoxypropanol group.

7. The compound of claim 1 which comprises the following formula III:

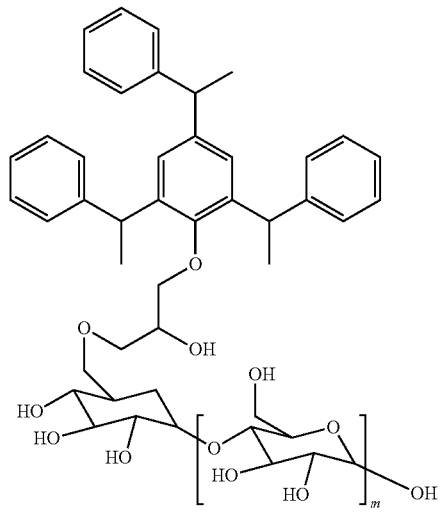

8. A method comprising the step of contacting a maltodextrin with a di- and/or a tristyrylphenol monoglycidyl ether in the presence of a Lewis acid under conditions sufficient to produce a di- and/or a tristyrylphenol monoglycidyl ether adduct of the maltodextrin, wherein the maltodextrin is represented by Formula I:

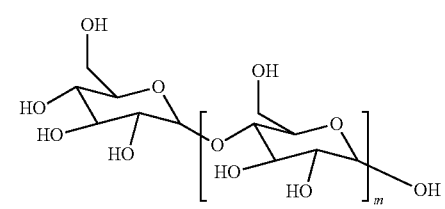

where m is from 1 to 60; and the di- and/or the tristyrylphenol monoglycidyl ether is represented by Formula II:

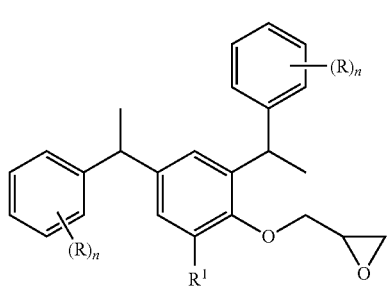

where each R is independently F, Cl, Br, CN, $C_1$-$C_6$-alkyl, or $C_1$-$C_6$-alkoxy; $R^1$ is H or 1-phenylethyl; and each n is independently 0, 1, 2, or 3.

9. The method of claim 8 wherein the maltodextrin and the di- and/or the tristyrylphenol monoglycidyl ether are contacted together under anhydrous conditions in a polar aprotic solvent at a temperature in the range of from 60° C. to 125° C., wherein the Lewis acid is boron trifluoride; and wherein n is 0.

10. The method of claim 9 wherein the maltodextrin and the di- and/or the tristyrylphenol monoglycidyl ether are contacted together at a temperature in the range of from 60° C. to 100° C.

\* \* \* \* \*